United States Patent
Antoni

[11] Patent Number: 5,842,703
[45] Date of Patent: Dec. 1, 1998

[54] FORCE-ACTUATED CHUCK

[75] Inventor: Herbert Antoni, Neuss, Germany

[73] Assignee: Forkardt GmbH, Erkrath, Germany

[21] Appl. No.: 910,088

[22] Filed: Aug. 12, 1997

[30] Foreign Application Priority Data

Jan. 17, 1997 [EP] European Pat. Off. .............. 97100669

[51] Int. Cl.[6] .......................... B23B 31/16; B23B 31/177; B23B 31/14

[52] U.S. Cl. .......................... 279/123; 279/110; 279/121; 279/130

[58] Field of Search ................................. 279/123, 110, 279/121, 130, 157, 158

[56] References Cited

U.S. PATENT DOCUMENTS

| | | |
|---|---|---|
| 4,288,085 | 9/1981 | Antoni ..................................... 279/121 |
| 5,060,957 | 10/1991 | Stoltzenberg et al. ................... 279/121 |
| 5,292,139 | 3/1994 | Gaillard ................................... 279/123 |
| 5,522,607 | 6/1996 | Chen ........................................ 279/123 |

FOREIGN PATENT DOCUMENTS 3822506  7/1989  Germany .

*Primary Examiner*—Steven C. Bishop
*Attorney, Agent, or Firm*—Robert W. Becker & Associates

[57] ABSTRACT

A force-actuated chuck includes a chuck body having radial jaw guides and clamping jaws guided in the radial jaw guides. At least one force-activated movable drive member is arranged in the chuck body for driving the clamping jaws. Each one of the radial jaw guides has a centrally arranged cutout for receiving a lubricant.

6 Claims, 3 Drawing Sheets

FORCE-ACTUATED CHUCK

BACKGROUND OF THE INVENTION

The present invention relates to a force-actuated chuck with a chuck body and slidably guided clamping jaws in radial guides of the chuck body which are driven by at least one drive member arranged in the chuck body and driven by a force generator.

Such force-actuated clamping chucks are known in a plurality of embodiments. Conventionally, the clamping jaws are embodied as a one-part construction or are comprised of two parts in the form of a base jaw and jaw inserts that form together the clamping jaw. They are actuated by axially displacable pistons within the chuck body. The piston is driven by a force generator. The connection between the piston and the clamping jaws is preferably achieved with a key and key groove arrangement.

The clamping forces and especially the repeat precision for the magnitude of the clamping force produced by the pressure medium-actuated force generator depends greatly on the respective lubrication of the gliding surfaces between the force generator and the clamping jaws guided in radial guides of the chuck body and between the clamping jaws and the chuck body.

In order to ensure lubrication as uniform as possible of the drive parts of such force-actuated clamping chucks, it is known from German Patent 38 22 506 to provide within the chuck body of the chuck at least one hollow space that can be filled with the lubricant and is connected via lubricant bores to the gliding surfaces of the chuck assembly. A movable chuck part for producing the necessary pumping movement for forcing the lubricant to the desired locations projects into and is movable by the driving action of the clamping jaws. Preferably, such a movable chuck part is a centrifugal force compensation weight of a centrifugal force compensation device.

Because of the lubricant bores extending between the hollow space that contains the lubricant and the individual glide surfaces, the known chuck is prone to be insufficiently lubricated since these long, narrow and partly deflected lubricant bores become plugged easily and the supply of lubricant to the most important glide surfaces of the chuck may be interrupted.

It is therefore an object of the present invention to provide a force-actuated clamping chuck of the aforementioned kind in which the most important gliding surfaces are reliably supplied with lubricant.

SUMMARY OF THE INVENTION

A force-actuated chuck according to the present invention is primarily characterized by:
A chuck body having radial jaw guides;
Clamping jaws guided in the radial jaw guides;
At least one force-activated movable drive member arranged in the chuck body for driving the clamping jaws;
Each one of the radial jaw guides having a centrally arranged cutout for receiving the lubricant.
The chuck preferably further comprises lubricant channels wherein at least one of the lubricant channels opens into each one of the cutouts.
The chuck may further comprise lubrication nipples connected to outer ends of the lubricant channels.
In a preferred embodiment of the invention, the lubricant channels are connected to a central lubrication system of the chuck.

The chuck body comprises lubricant chambers and the lubricant channels are preferably connected to the lubricant chambers. The chuck body further comprises at least one movable part for producing a pumping action that forces a lubricant contained in the lubricant chambers into the cutouts. The at least one movable part is moved when the clamping jaws are driven.

The movable part is preferably a compensation weight of a centrifugal force compensation device.

According to the present invention the radial jaw guides have centrally arranged cutouts that can be filled with the lubricant for proper lubrication.

The centrally arranged cutouts within the radial jaw guides of the chuck body supply reliably the lubricant for a uniform lubrication of the most important gliding surfaces of the force-actuated chuck because the guide parts of the clamping jaws cooperating with the radial jaw guides of the chuck body project directly into the hollow space (cutout) that is filled with the lubricant. In this manner, when the clamping jaws are radially moved, there is always a constant and reliable supply of lubricant to the radial jaw guides. Since the inventive cutouts are centrally arranged within the radial jaw guides of the chuck, the size reduction of the guide surfaces providing the support action of the guides is of no consequence because the clamping jaws, for an external as well as an internal clamping action, are supported alternatingly at the radially inwardly positioned as well as the radially outwardly positioned end of the radial jaw guides of the chuck body. The central portion of the radial jaw guide is not required for supporting the jaws. The embodiment of the cutout, which is preferably in the form of a hollow lubricant-filled space in the area of the radial jaw guides of the chuck body, thus has no disadvantageous effects onto the support action of the jaw guides and thus onto the load bearing capacity of the force-actuated chuck.

According to a further feature of the invention, at least one lubricant channel opens into each cutout. The lubricating channels within the chuck body so that the central area of the radial guides formed by the cutout and providing a hollow space is at any time filled or refilled with lubricant.

For this purpose, it is inventively suggested to connect the exterior end of the lubricant channel to a central lubrication system or to connect the external end of the lubricant channel to a lubrication nipple which is preferably provided in a cutout at the circumference of the chuck body. In the alternative, according to another feature of the invention, the end of the lubricant channel facing away from the cutout can be connected to a lubricant chamber that is filled with lubricant and which is embodied according to the aforementioned prior art within the chuck body and into which a chuck part that is movable upon driving the clamping jaws and generates the pumping action required for displacing or moving the lubricant out of the lubricant chamber into at least one of the cutouts. Preferably, the movable chuck part is a compensation weight of a centrifugal force compensation device.

The invention thus provides a force-actuated clamping chuck wherein the gliding surfaces, necessary for ensuring the clamping forces, generated by the force generator activated by a pressure medium, and for ensuring the repeat precision of the magnitude of the clamping force, i.e., the radial jaw guides between the chuck body and the clamping jaws, can be reliably supplied with lubricant without requiring great constructive expenditures.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–4.

Figure 1:
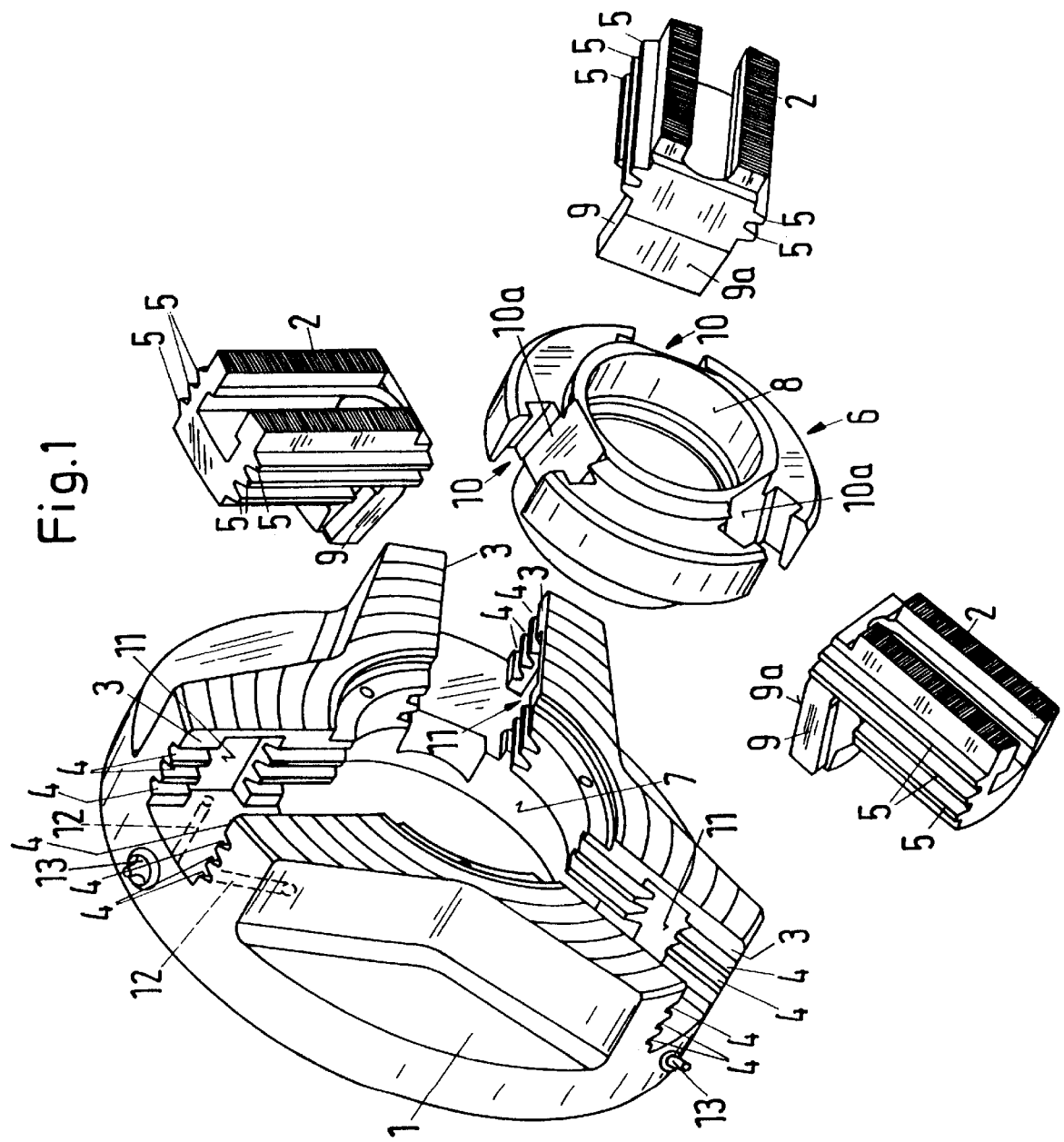
FIG. 1 shows a perspective exploded view of a first embodiment of the inventive chuck.

FIG. 1 shows a first embodiment of the inventive chuck with a chuck body 1 in which three clamping jaws 2 are radially displaceable within radial jaw guides 3. For this purpose, the oppositely arranged lateral surfaces of the radial jaw guides 3 are provided with a plurality of guide grooves 4 and the lateral surfaces of the clamping jaws 2 have matching guide bars 5 which cooperate with the guide grooves 4. The radial displacement of the clamping jaws 2 is carried out by a clamping piston 6 which is displacable in a bore 7 of the chuck body 1 in the axial direction. For receiving workpieces to be machined, the clamping piston 6 positioned in the bore of the chuck body 1 is provided with a central throughbore 8.

Each clamping jaw 2 which in the represented embodiment is a base jaw, has a key 9 at its radially inwardly positioned part which in cross-section is T-shaped. It can be used for the radial displacement of the clamping jaws 2 via the clamping piston 6 and is inserted for this purpose into a correspondingly designed key groove 10 of the clamping piston 6. For guiding the key 9 of the clamping jaw 2 within the key groove 10 of the clamping piston 6, the radially inwardly positioned rearward portion of the key 9 is embodied as a continuous key surface 9a which cooperates with the also continuously embodied key surface 10a of the key groove 10 of the clamping piston 6.

As can be seen in FIG. 1, the guide bars 5 extending on the lateral surfaces of the clamping jaws 2 at the forward portion of the clamping jaw 2 extend over the entire length of the clamping jaw. In the rearward part of the clamping jaw 2, the guide bars 5 due to the embodiment of the key 9 are shortened. In an especially advantageous embodiment, the guide bars 5 have a trapezoidal cross-sectional profile. Due to the embodiment of the guide bars 5 at the forward part of the clamping jaws 2 so as to extend over the entire length of the clamping jaw 2, it is achieved that for internal clamping of workpieces the high tilting moments are received by the guide bars 5 and the guide grooves 4 over the entire length of the clamping jaw 2 so that no impermissibly high surface pressure results that could cause increased wear of the device.

In order to supply the gliding surfaces of the guide grooves 4 and of the guide bars 5 with a sufficient amount of lubricant, in the central area of each radial jaw guide 3 a cutout 11 is provided into which a lubricant channel 12 opens. In the first embodiment, this lubricant channel 12 and a neighboring lubricant channel 12 are connected with their exterior end to a common lubrication nipple 13. The lubricant channels 12 can also be connected to a central lubrication system.

By filling the cutouts 11 with lubricant, with each radial movement of the guide bar 5 of the clamping jaw 2 extending into the cutout 11 lubricant is entrained and supplied to the guide grooves 4 of the chuck body 1. This results in a continuous and permanent lubrication of the gliding surfaces of the clamping chuck that are necessary for ensuring the clamping force and the repeat precision of its magnitude. Since the cutouts 11 are embodied within the central area of the radial jaw guides 3 of the chuck body 1, the embodiment of the cutouts 11, respectively, the resulting size reduction of the guide surfaces for supporting action of the radial jaw guides 3 is of no harm because the clamping jaws for an external clamping as well as an internal clamping can be resting alternatingly at the radially inwardly positioned as well as the radially outwardly positioned portions of the radial jaw guides of the chuck body 1. The central portion of the radial jaw guide 3 is not required for the supporting action. The cutouts 11 provided within the central area of the radial jaw guides 3 within the chuck body 1 thus have no negative effect onto the support action of the radial jaw guides 3 and thus onto the load bearing capability of the force-actuated clamping chuck.

Figure 2:
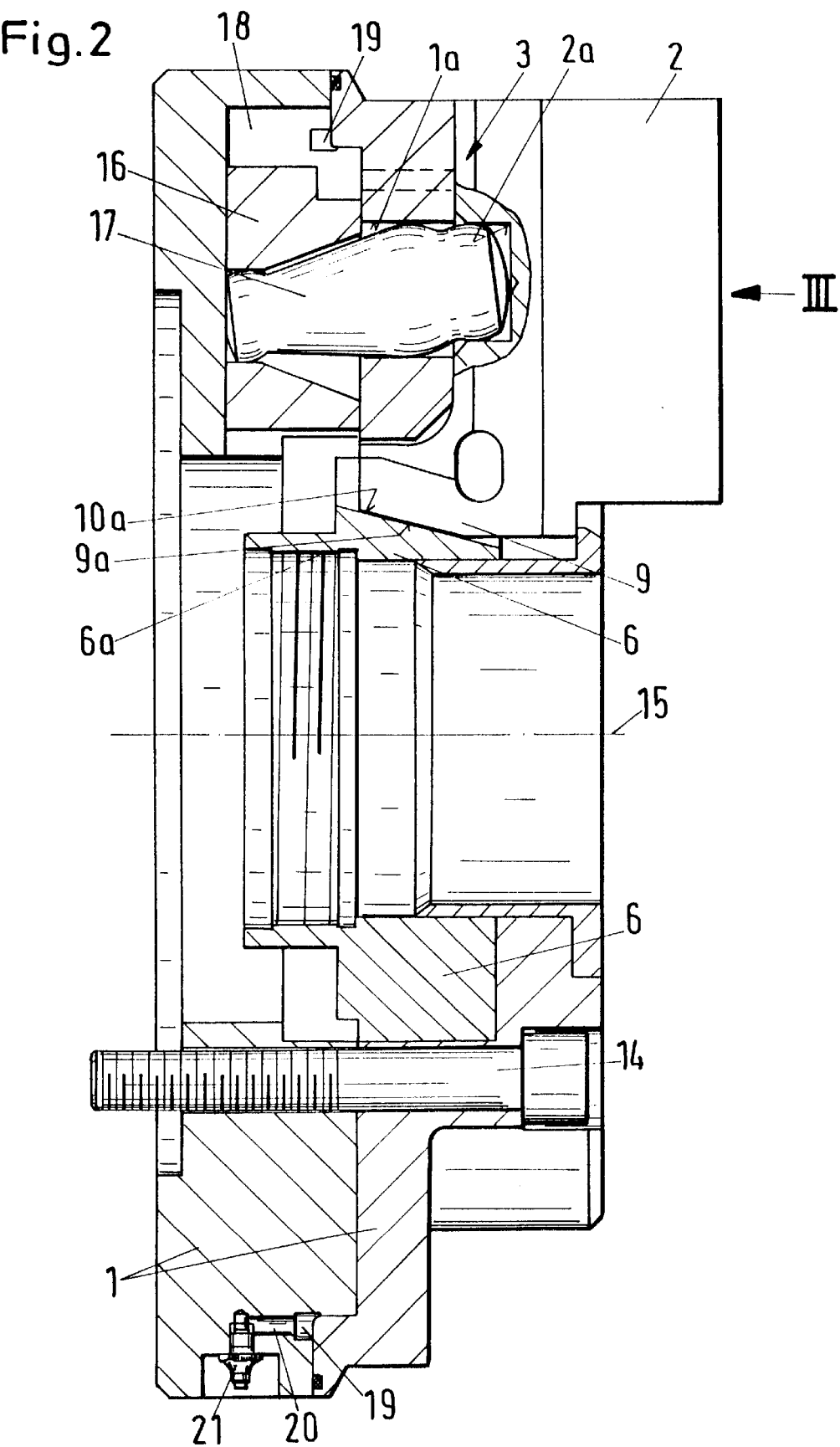
FIG. 2 shows a longitudinal section of a second embodiment including a centrifugal force compensation device.
Figure 3:
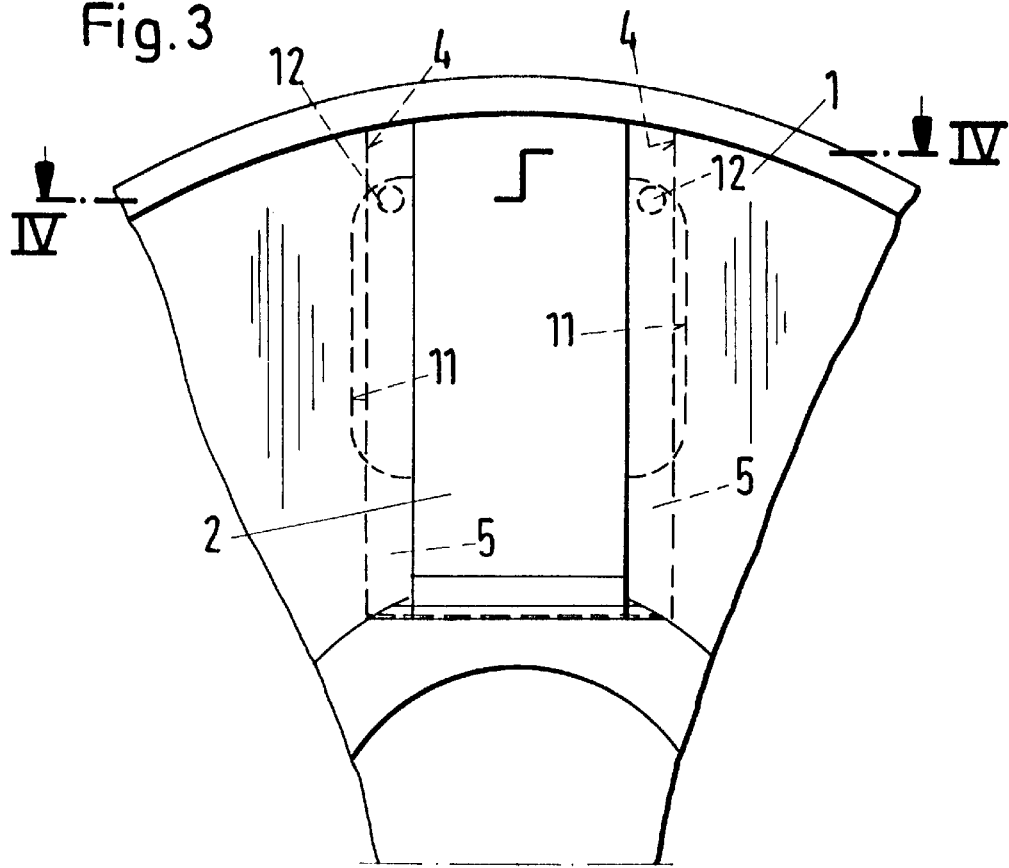
FIG. 3 shows a portion of an end view according to arrow III in FIG. 2.
Figure 4:
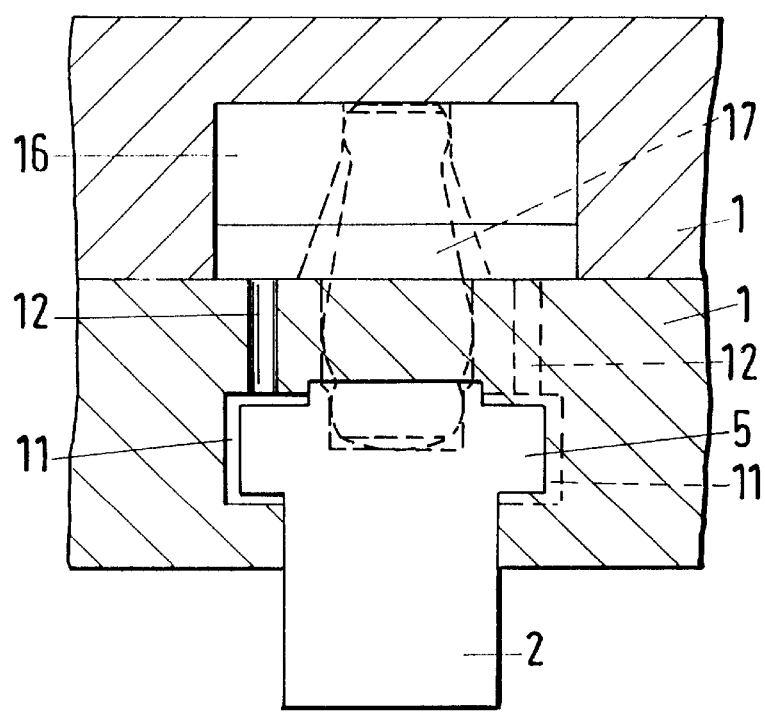
FIG. 4 shows a section along the line IV—IV of FIG. 3.

The second embodiment represented in FIGS. 2 through 4 shows a clamping chuck including a centrifugal force compensation device. This clamping chuck also includes a chuck body 1 which is connected with screws 14 at a non-represented flange of a rotatingly driven spindle of a machine tool. Within the radial jaw guides 3 of these chuck bodies 1 in the shown embodiment three clamping jaws 2 are slidably displaced. Because of the section line only one of the three clamping jaws 2 is shown. Each one of these clamping jaws 2 is connected by a key 9 with a key groove 10 of a clamping piston 6 receiving the keys which is guided so as to be movable in the axial direction within the chuck body 1 and which is provided with an inner thread 6a. The inner thread 6a connects the chuck to an actuating rod of the machine tool that is not represented in the drawing. The force generator which is also not shown in the drawing is arranged at the other end of the tool machine spindle. The force generator may be realized by the pressure medium-actuated cylinder and a respective piston. Since the clamping piston 6 is connected with the keys 9 of the clamping jaws 2 via the surfaces 9a and 10a, extending to the rotational axis 15 of the clamping chuck at an acute angle, a movement of the clamping piston 6 in the axial direction results in a radial adjusting movement of the clamping jaws.

In order to eliminate or at least to reduce considerably the centrifugal forces acting at high rpm onto the clamping chuck and the clamping jaws 2, in the second embodiment compensation weights 16 are provided. Each clamping jaw 2 has arranged thereat such a compensation weight 16. The compensation weight 16 is arranged centrally behind the clamping jaw 2 within the chuck body 1 and is connected via a lever 17 supported within a bore 1a of the chuck body 1 with the clamping jaw 2. The drawing shows that this lever 17 engages with its forward end a blind bore 2a of the clamping jaw 2 while its rearward end is movably arranged within the compensation weight 16. The centrifugal force which acts radially outwardly onto the clamping jaw 2 is in this manner compensated by a matching force which due to the centrifugal force acting onto the compensation weight 16 loads the lever 17 so that it loads in the centripetal direction the clamping jaw 2. In this manner at least the greater portion of the centrifugal force acting on the clamping jaw 2 can be compensated.

In the second embodiment, radial jaw guides 3, including the guide groove 4 within the chuck body 1 and the matching guide bar 5 within the clamping jaw 2, are centrally provided with cutouts 11 which provide a hollow space to be filled by the lubricant. The central portion of the respective guide bar 5 extends into the hollow, lubricant-filled space. Each cutout 11 is connected via a lubricant channel 12 to the hollow chamber 18 within the chuck body 1 in which a compensation weight 16 is positioned and which is filled with lubricant. This lubricant is forced by the movement of the clamping jaws 2, and thus of the compensation weights 16, through the lubricant channel 12 into the corresponding cutout 11 and thus supplies the required lubricant.

The hollow chambers 18 within the chuck body 1 provided for the compensation weights 16 to this annular channel 19 in the shown embodiment by an annular channel 19 extending within the chuck body 1. A lubrication nipple 21 is connected to this annular channel 19 via a lubricant supply channel 20 so that the hollow chambers 18 can be supplied with lubricant.

Before operating the clamping chuck, the hollow chambers 18 are thus filled via the lubrication nipples 21, the lubricant supply channel 20, and the annular channel 19 with the lubricant. When the clamping chuck is subsequently used for clamping a workpiece, for example, by external clamping, the compensation weights 16 are moved radially outwardly and a reduction of the size of the hollow chamber 18 is caused by the compensation weights 16. Thus the lubricant contained within the hollow chamber 18 is forced through the corresponding lubricant channels 12 into the corresponding cutout 11 where it is available for lubricating the radial jaw guides 3. This lubrication process is repeated in a forced manner for each clamping movement of the clamping jaws 2 so that the radial jaw guides 3 are lubricated in a forced manner in the area between the clamping jaws 2 and the chuck body 1 so that a uniform and good lubrication can be achieved. For each clamping and lubrication process a portion of the lubricant is radially inwardly forced into respective gaps. The lubricant moves under the effect of the centrifugal force generated by rotation of the clamping chuck back into the hollow chamber 18 so that it is always refilled. Only after an extended period of use most of the lubricant has been used up and a complete refilling of the hollow chamber 18 from the exterior through the lubrication nipple 21 is required.

The present invention is, of course, in no way restricted to the specific disclosure of the specification and drawings, but also encompasses any modifications within the scope of the appended claims.

What I claim is:

1. A force-actuated chuck comprising:

a chuck body having radial jaw guides;

clamping jaws guided in said radial jaw guides;

at least one force-activated moveable drive member arranged in said chuck body for driving said clamping jaws;

each one of said radial jaw guides having a centrally arranged cutout for receiving a lubricant.

2. A chuck according to claim 1, further comprising lubricant channels wherein at least one of said lubricant channels opens into each one of said cutouts.

3. A chuck according to claim 1, further comprising lubrication nipples connected to outer ends of said lubricant channels.

4. A chuck according to claim 1, wherein said lubricant channels are connected to a central lubrication system of said chuck.

5. A chuck according to claim 1, wherein said chuck body comprises lubricant chambers and wherein said lubricant channels are connected to said lubricant chambers, said chuck body further comprising at least one moveable part for producing a pumping action that forces a lubricant contained in said lubricant chambers into said cutouts, said at least one moveable part being moved when said clamping jaws are driven.

6. A chuck according to claim 5, wherein said moveable part is a compensation weight of a centrifugal force compensation device.

* * * * *